July 31, 1923.

E. CHESHIRE

1,463,545

CUTTING MECHANISM

Filed Jan. 21, 1921

Inventor.
Edward Cheshire,
By Wilkinson, Huxley, Byron & Knight
Attorneys

Patented July 31, 1923.

1,463,545

UNITED STATES PATENT OFFICE.

EDWARD CHESHIRE, OF BERLIN TOWNSHIP, WAUKESHA COUNTY, WISCONSIN.

CUTTING MECHANISM.

Application filed January 21, 1921. Serial No. 438,813.

*To all whom it may concern:*

Be it known that I, EDWARD CHESHIRE, a citizen of the United States, residing at Berlin Township, in the county of Waukesha and State of Wisconsin, have invented certain new and useful Improvements in Cutting Mechanism, of which the following is a specification.

This invention relates to cutting mechanism, and more particularly to saw, trimmer and miterer mechanism, together with gauging and clamping mechanism associated therewith.

The invention finds particular application in connection with sawing and trimming linotype slugs, mitering borders, and sawing and trimming cuts or electrotypes for printers' use. However, it will be understood that the invention is not limited to such applications.

Heretofore all trimming saw devices have been arranged for receiving the work at the rear or saw approaching side of the retaining gauge. As a result thereof, the saw in cutting into a plurality of gripped linotype slugs, borders, cuts or electrodes, pulls each advance slug or the like away from its next succeeding slug and permits burrs to enter between the adjacent slugs, thereby causing the material to become "phatted" or spread out at the sawed edge, resulting in the type assuming irregular or non-parallel lines.

Again, the gripping mechanisms used heretofore have been deficient in that the ribbed material when clamped had a tendency to, and much of the time did, cause a "fanning" action of the material at the edge opposite the sawed edge. This "fanning" action causes the advance end of the material to skew or feed further into the saw, resulting in the material being cut on a bias and some of the type being cut off of some of the lines.

Accordingly, one object is to overcome the above mentioned objectionable features.

Another object is to provide simple, safe, durable and efficient cutting mechanism including means for adjusting the table to meet different requirements, means for properly gauging the material to be cut, mitering means and clamping means, all simple in construction and accurate and clean in operation, and cooperating in an improved manner to meet all of the commercial requirements.

These and other objects are accomplished by means of the arrangement disclosed on the accompanying sheets of drawings, in which—

Referring to the drawings, it will be noted that my invention is disclosed in connection with saw mechanism including a cored tubular standard 10, upon the upper and side portion of which are mounted horizontal bearings 11 having a shaft 12 journaled therein. The shaft 12 between the bearings is provided with a pulley 13 which is driven through any suitable belt 14. The inner end of the shaft, which terminates above a medial portion of the standard, has mounted thereon a circular saw 15.

The side of the standard 10 opposite to the bearings 11 is formed with vertically extending guide ribs 16 between which is positioned a supporting bracket 17 having a vertically extending slot 18. A thumb bolt 19 extending through the slot and threaded into the standard 10 adjustably secures the bracket on the standard. A lever 20 having its shorter end 20' extending beneath the lower end of the bracket 17 is fulcrumed on the standard and is adapted to adjust the vertical position of the bracket thereon when the thumb bolt is loosened. A horizontally extending table 21 is mounted firmly upon the bracket 17 and is shaped to extend in part on both sides of the saw. By means of this arrangement the table may be retained in its lower position for sawing and trimming the material or raised to a position for sawing without trimming. This table is provided in its upper surface with an elongated guide groove 22 of rectangular form in cross section which extends adjacent to and parallel with the outer side face of the saw 15.

Within the guide groove 22 is positioned a slidable work member 23 which is formed with a rabbeted or recessed portion 24 in which is slidably mounted a clamping jaw member 25 having upstanding clamping portions 24' and 25. The slides or clamping bar members 23 and 25 both pass under the gauge or jaw member 38 making a compact and efficient arrangement. The clamping bar or jaw member 25 is of elongated form and its upper edge along its rear end portion is provided with upwardly and forwardly extending angular rack or saw teeth 26 which are engaged by a complementary member 27 having downwardly and rearwardly extending angular rack or saw teeth 27', so that as member 27 moves downwardly it will also move rearwardly A frame or casing 28 extending over the member 27 and mounted on the slidable work member 23 is provided with a downwardly and rearwardly extending guide portion 29 which is engaged by the forwardly and upwardly angled portion 30 of the complementary member 27. The forward end 31 of the complementary member 27 is angled downwardly and forwardly and is engaged by a wedge block member 32 which is positioned between an end wall of the casing 28 and the angular end 31 of the complementary member 27. The wedge block 32 is formed with a rear wedge edge 32' which coacts with the angled portion 31 to move the complementary member 27 downwardly and rearwardly when the wedge block is pushed downwardly.

Figure 1:
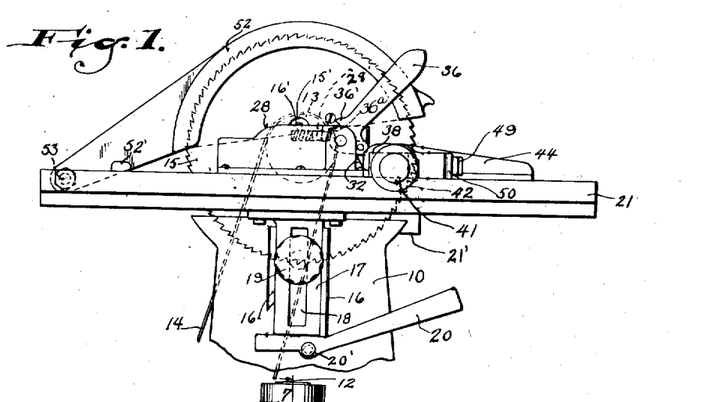
Figure 1 is a side view of the upper portion of the improved trimming saw.
Figure 2:
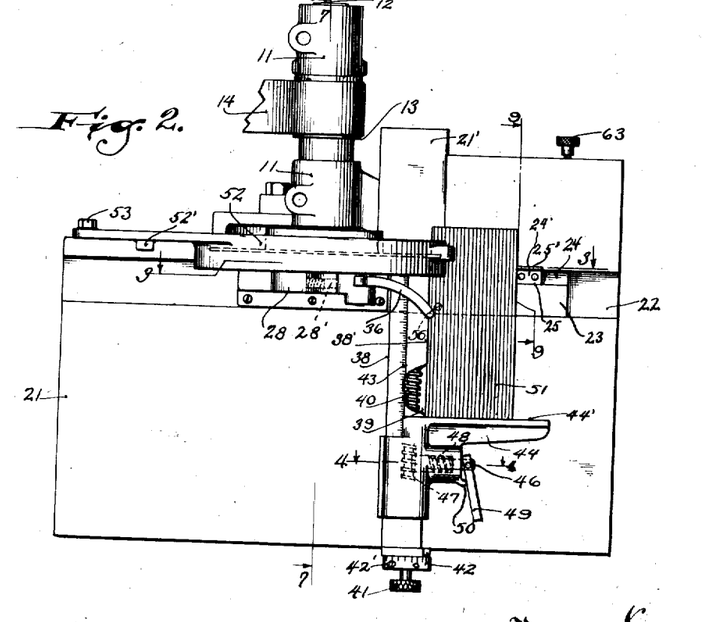
Figure 2 is a top view thereof, parts broken away to show interior construction, the view also showing linotype slugs in position to be sawed and trimmed.
Figure 3:
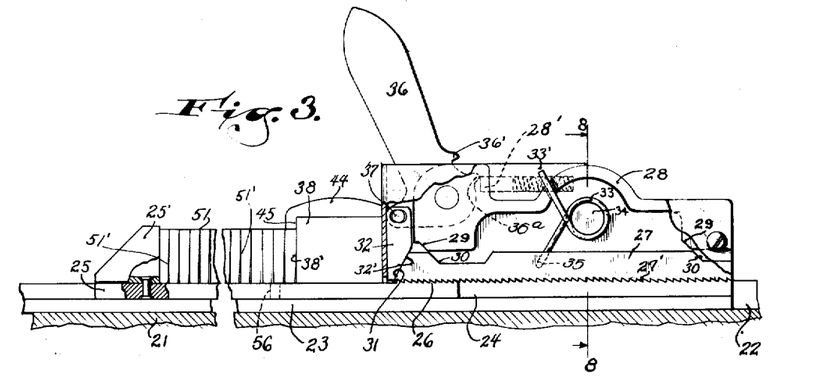
Figure 3 is an enlarged vertical sectional view taken on line 3—3 of Figure 2.
Figure 4:
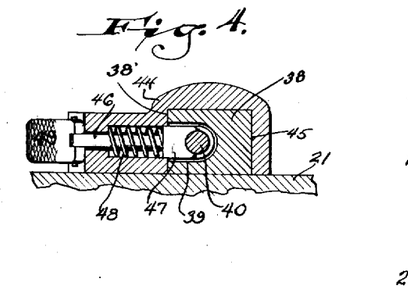
Figure 4 is a sectional detail view taken on line 4—4 of Figure 2.

In moving downwardly the rack teeth of the complementary member 27 will engage the rack teeth of the clamping jaw member 25 and draw said member rearwardly to a clamping position as shown in Figure 3. A coiled spring 33 extending around a lug 34 projecting from the inner surface of one of the casing walls has one end 33' connected to the casing and the other end 35 connected to the complementary member 27 to move said member 27 forwardly and upwardly when the wedge member 32 is moved upwardly into a releasing position. The upward movement of the complementary member 27 permits the free movement of the clamping jaw member 25 to any adjusted position.

A bell crank lever 36 fulcrumed in the casing 28 has its shorter arm connected to the wedge member 32 by a pin and slot connection 37 to raise and lower said member. A stop lug 36' formed on the bell crank lever cooperates with a portion of the casing to limit the movement of said lever in releasing the clamping member 32. A spring-pressed plunger 28' slidably mounted in a socket in the casing 28 is yieldably pressed against a projection 36ª on the lever 36 for yieldably holding the latter in adjusted position, thereby also preventing work from rattling loose. When the lever 36 is in its central or released position, the projection 36ª is in a central position with respect to the plunger 28'. However, when the lever 36 is moved forwardly the projection 36ª moves upwardly whereby the leverage of the spring-pressed plunger 28' on the lever 36 is increased for increasing the locking action of the lever 36 and wedge 32 in clamping position.

A relatively fixed upstanding jaw or gauge 38 is mounted firmly on the slidable work member 23 and extends at right angles therefrom to the outer side edge of the table 21. The work to be cut is clamped between the fixed jaw 38 and the movable jaw 25. Said fixed jaw has an elongated recess 39 formed in its front face to receive an adjusting screw 40 which extends approximately the full length of the fixed jaw and through the outer end thereof, and its outer end is provided with a milled head 41 for convenience in rotating the screw. The screw adjacent the head is also provided with an adjustable collar 42 having a scale delineated thereon to indicate the degree of rotation of said screw. A set screw 42' locks the collar on the screw.

Figures 7, 11:
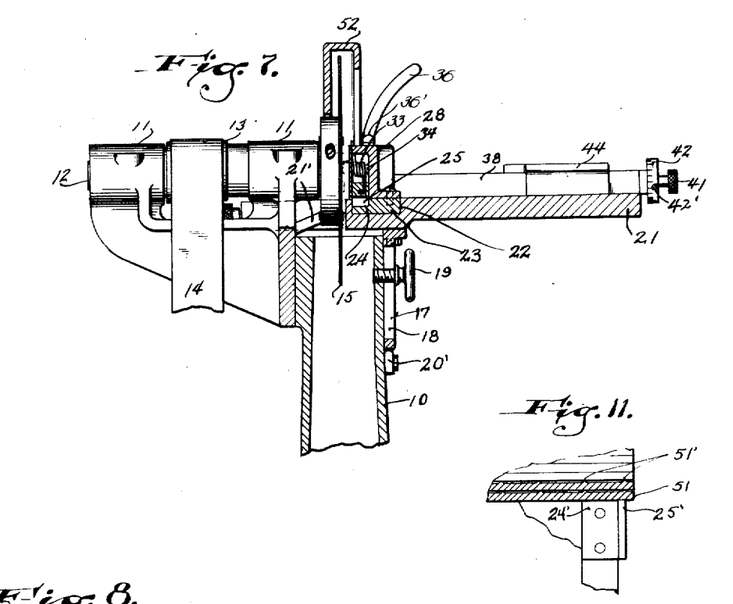
Figure 7 is a vertical sectional view taken on line 7—7 of Figure 2.
Figure 11 is a top detail view of some of the slugs and a portion of the movable clamp.
Figure 8:
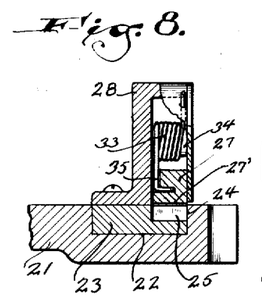
Figure 8 is a transverse sectional view taken on line 8—8 of Figure 3, part of the casing being shown in elevation.
Figure 9:
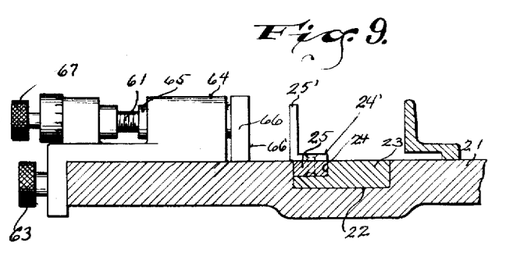
Figure 9 is a transverse sectional detail view taken on line 9—9 of Figure 2, and including another micrometer adjustment means.

In order to accurately gauge the length of linotype slugs or other parts to be cut, the upper surface of the fixed jaw 38 is formed with or has mounted thereon a graduated scale 43, and is provided with a co-acting side gauge arm 44, the working face 44' of which extends forwardly at right angles from the front face 38' of the fixed jaw 38. Said arm 44 is formed with a rectangular recess or groove 45 in its under side so the arm will fit and slide over the fixed jaw 38 and be guided thereby and retain its right-angular position with relation thereto. The arm 44 is also provided with a spring-pressed plunger 46 having a section of a nut 47 mounted on its inner end which is engageable with the adjusting screw 40 within the fixed jaw 38. A coiled spring 48 normally holds the nut in threaded engagement with the screw and a lever 49 pivotally connected to the outer end of the plunger 46 and bearing medially on a fulcrum 50 provides for manually disengaging the nut section 47 from the screw 40 when it is desired to quickly adjust the gauge 44 along the fixed jaw 38 preparatory to the micrometer adjustment with the milled nut 41 and the scaled index collar 42. It will be noted that all slugs in common use are tapered and formed with vertical ribs 51' (see Figure 11), and that the portions 24' and 25' of the movable jaw 25 are of greater width than the distance between the ribs to prevent the slugs rocking on said ribs and to make possible a firm grip when in clamped position. In this way "fanning" action of the material is overcome.

Figure 10:
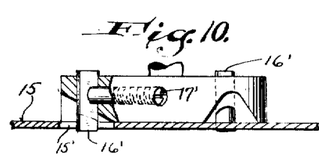
Figure 10 is a sectional detail view of the saw.

The circular saw 15 is formed with openings 15' (see Figure 10) through which extend cutters 16' adjustably connected to the hub of the saw by set screws 17'. The saw first cuts off the work and the cutters 16' plane or finish the cut surface when the table is so positioned as to have the work engage both saw and cutters.

In using the portion of the machine thus far described, the linotype slugs 51 or other parts are placed on the table between the fixed and movable jaw and the movable jaw is advanced to lightly engage the slugs. With the outer edges of the slugs firmly pressed against the movable gauge arm 44, the latter is then adjusted for cutting or trimming the slugs the desired amount, the micrometer screw 40 being adjusted for precision of measurement if necessary. When properly arranged the lever 36 is pulled forwardly to clamp the slugs firmly in adjusted position and the whole slidable unit, which might be termed a slidable vise, is manually pushed rearwardly to permit the circular saw to cut the end portions of the slugs at right angles to their length, and the cutters to trim or finish the cut edges. When the operation is completed the vise is pulled forwardly and the slugs are released by pushing the clamping lever 36 rearwardly, whereupon the operation may be repeated. The material to be cut being at the front side of the main gauge 38 and being firmly clamped, it is made possible to overcome the pull of the saw which separates adjacent pieces of material and causes the material to become " phatted," and also prevents burrs being injected between adjacent pieces of material. " Fanning " also is prevented.

As the waste portions are cut, they will drop on an inclined portion 21' of the table and be deflected therefrom to a waste receptacle (not shown) placed below.

A saw guard 52 extending over the upper portion of the saw protects the operator against accidental injury. Said guard is connected to the rear portion of the table by a pivot bolt 53 to permit the guard to be easily raised from the saw, and a projecting lug 52' limits the downward covering movement of said cover.

As it is almost impossible to replace the cutters after being sharpened in exactly the same position for accurate work with relation to the micrometer adjustment scales of the gauges, this invention provides for recalibrating the parts in a very simple manner as follows:

A number of slugs are clamped in the machine and cut and planed to determine zero position, and while still held by the clamp, the working face 66' of a gauge 61 is moved to engage the cut ends of the slugs and when in engagement therewith a collar 67' of the micrometer screw 67 is loosened and turned to register zero and its set screw 68 is then turned to lock the collar in adjusted zero position. The slugs are now removed and the movable clamping jaw moved outwardly to permit the gauge arm 44 to be moved so that its working face 44' will engage the working face 66' of the gauge 61. The collar 42 is then loosened and turned to indicate zero position and its set screw 42' is then turned to lock the collar to the shaft. When thus adjusted to zero position the parts and the scales all bear a fixed relation to the plane of cut of the cutters and threads of the gauge screws and the thickness in points of the slugs.

The gauge screw 67 also has a certain pitch with relation to cutting the slugs at a miter so that the gauge 61 may be adjusted a certain number of points corresponding to the point thickness of the slugs to exactly miter the slug ends from the corner ends without shortening the slugs.

In trimming slugs, the table is adjusted in its lower position, as shown, in order to have said slugs engaged by the saw and the cutters, but in cutting electrotypes or other matter not requiring the use of very fine close work, the table may be raised by loosening the bolt 19 and swinging the lever 20 downwardly so that its shorter end will raise the table the desired distance to cause the work to clear the cutters. The bolt 20 is then tightened and the parts operated as before. The lever part 20' is shaped to hold the table in either one of its two positions. The construction also permits trimming the side portion of the slugs or cutting off the ribs thereof. To accomplish this, the slug is placed between the relatively stationary jaw 38 and the vertically arranged overhanging portion 25' of the movable jaw 25 in endwise relation and then clamped in the manner before described after being properly positioned by the gauges. When clamped in position the vise is pushed toward the saw to have the side portion removed by the cutters or the saw and the cutters.

Figure 5:
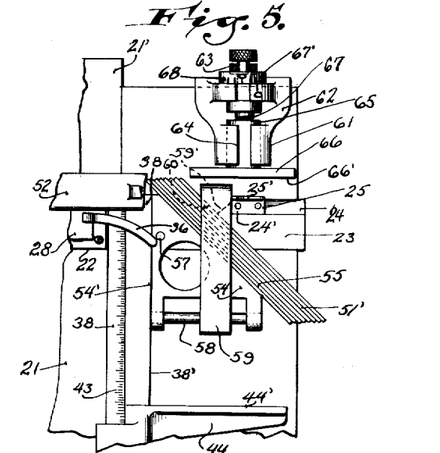
Figure 5 is a top view of a portion of the table showing the mitering attachment mounted thereon.
Figure 6:
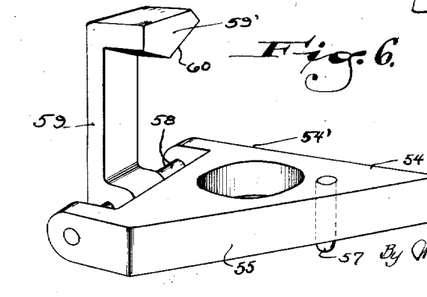
Figure 6 is a perspective view of a portion of the mitering attachment showing the clamping member in open position.

In mitering borders or cutting off slugs or other parts at forty-five degree, or other, angles, a mitering attachment (see Figures 5 and 6) is provided which comprises a body portion 54 having a straight face 54' which bears against the front face 38' of the fixed jaw and a work-holding face 55 extending at the desired angle, it being a forty-five degree angle with relation to the face 54' in this particular instance. The slidable work member 23 is provided with an aperture 56 (see Figure 3) adjacent the fixed jaw to receive the downwardly extending dowel pin 57 of the body part which holds said part in position on the bar 23. The body part is also provided with a fixed horizontally extending guide rod 58 on which is slidably and pivotally mounted the outer end of a clamping member 59. The guide rod 58 extends at right angles to the face 38' of the fixed jaw 38 so that the clamping member 59 is movable toward and away from the said fixed jaw 38 and the angular surface 55 of the attachment 54. The free end of the clamping member 59 is formed with a downwardly extending lug 59' having an angular inner face 60 which is parallel to the face 55 when the arm is swung into clamping position, as illustrated in Figure 5. When in clamping position the free end of the arm 59 is engaged by the clamping jaw portion 25' and clamps the slugs 51' interposed between said lug 59' and the face 55 of the body part 54. Said clamping action is controlled by the movement of the bell crank lever 36 before described.

In order to properly aline the slugs 51' endwise, the adjustable gauge 61 is used. It includes an angular body portion 62 removably secured to the side edge of the table by a thumb screw 63. The upper portion of said gauge is formed with a tubular part 64 in which is slidably adjustably positioned the shank 65 of the adjustable gauge plate 66. The working face 66' of the gauge plate is parallel to the side portions of the saw and the ends of the slugs are adapted to abut against said plate before being clamped in position. A micrometer screw 67 threaded into the shank 65 of the gauge and journaled in the body portion provides for adjusting the gauge plate toward or away from the line of cut of the saw. Said screw 67 is provided with a collar 67' having a scale 68 delineated thereon indicating points of thickness of slugs to be mitered.

It is my intention to cover all modifications of the invention falling within the spirit and scope of the following claims.

I claim:

1. In a device of the class described, clamping means for retaining in place material to be treated, said clamping means including relatively movable members having interlocking portions, wedge means for forcing said interlocking portions into operative association, and means for moving said interlocking members out of operative association when released by said wedge means.

2. In a device of the class described, clamping means for retaining in place material to be treated, said clamping means including relatively movable members having interlocking portions, wedge means for forcing said interlocking portions into operative association, means for moving said interlocking members out of operative association when released by said wedge means, and a spring-pressed plunger associated with said wedge means for yieldably retaining the latter in adjusted position.

3. In a device of the class described, clamping means for retaining in position work to be treated, said clamping means including relatively movable slide members having cooperating serrated portions, lever operated means for moving said serrated portions into operative engagement, and a spring for moving said serrated portions out of operative engagement when released by said lever operated means.

4. In a device of the class described, clamping means for retaining in position work to be treated, said clamping means including relatively movable slide members having cooperating serrated portions, lever operated means for moving said serrated portions into operative engagement, a spring for holding said serrated portions out of operative engagement when released by said lever operated means, and a spring-pressed plunger for yieldably holding the lever operated means in adjusted position.

5. In a device of the class described, a saw member, a table adjacent thereto and having a guideway, a work-holding member engaging said guideway and movable past the saw member, a gauge member carried by the work-holding member, and means for clamping work on the work-holding member.

6. In a device of the class described, a saw member, a table adjacent thereto having a guideway, a work-holding member cooperating with said guideway and movable past the saw and having a scale thereon, and means for clamping work on the work-holding member in front of the scale.

7. In a device of the class described, a saw member, a table adjacent thereto, a work-holding member movable in a straight line parallel to one side portion of the saw and provided with a portion extending at right angles to its line of movement, said right-angled portion provided with a point indicating scale, and means for clamping work on the work-holding member in front of the scale.

8. In a machine of the class described, clamping means for retaining in position slugs or other material to be treated, said clamping means including a jaw having a horizontally extending portion with a vertical clamping surface and an extending arm vertically therefrom with a vertical clamping surface whereby slugs may be clamped transversely in a manner to prevent "fanning" action of the slugs and longitudinally for trimming the sides of said slugs respectively.

9. In a device of the class described, the combination of a work-supporting table, a saw associated therewith, trimming means carried by said saw, and a lever for adjusting said table into a plurality of positions, one in which the saw only is effective and the other in which the saw and trimming means are effective.

10. In a device of the class described, the combination of a work-supporting table, cutting means associated therewith, jaws between which work to be treated is secured, a gauge movably mounted on one of said jaws, means for making a general adjustment of the gauge with respect to said jaw, and means for making a fine adjustment of one with respect to the other.

11. In a device of the class described, the combination of a work-supporting table, cutting means associated therewith, jaws between which work to be treated is clamped, a gauge movably mounted on one of said jaw members, associated threaded means carried by said jaw and said gauge releasable with respect to each other for permitting a general adjustment of the gauge with respect to the jaw, and micrometer means for making a fine adjustment of one with respect to the other when the threaded means are in operative association.

12. In a device of the class described, a saw member, a table adjacent thereto and having a guideway, a work-holding member engaging said guideway and movable past the saw member, a gauge member carried by the work-holding member and movable at right angles to the movement of the work-holding member for positioning work, and means for clamping work on the work-holding member at different angles with respect to said work holding member.

13. In a device of the class described, a saw, a trimming member associated therewith, a table adjacent thereto and having a guideway, a work-holding member movably mounted in said guideway, a fixed jaw member carried by the holding member, a gauge member carried by the fixed jaw member for positioning work, a movable clamping jaw member carried by the work-holding member, and means for moving and holding the clamping jaw member in clamping relation with the fixed jaw member.

14. In a device of the class described, a saw, a trimming member associated therewith, a table adjacent thereto and having a guideway extending parallel to the saw, a work-holding member movable in the guideway and having a fixed jaw extending at right angles thereto, a movable clamping jaw member carried by the work-holding member, means for moving and holding the clamping jaw member in clamping relation with the fixed jaw member.

15. In a device of the class described, a saw member, a table adjacent thereto and having a guide groove extending parallel to the saw, an elongated work-holding member movable in the guide groove and having a fixed jaw extending at right angles thereto and above the table, a gauge member adjustably slidably mounted on the fixed jaw, a movable clamping jaw member slidably mounted on the work-holding member and having a toothed portion, and toothed means engaging the toothed portion of the clamping jaw for moving said clamping jaw into clamping relation with the fixed jaw member.

16. In a device of the class described, a saw member, a table adjacent thereto and having a guide groove extending parallel to the same, an elongated work-holding member in the guide groove and having a fixed jaw extending at right angles thereto and above the table, a gauge member adjustably slidably mounted on the fixed jaw and extending at an angle thereto for positioning work, a movable clamping jaw member slidably mounted on the work-holding member and having a toothed portion, a toothed member engaging the toothed portion of the clamping jaw member for moving it in clamping relation with the fixed jaw member, and a wedge member for moving the toothed member.

17. In a device of the class described, a saw member, a table adjacent thereto having a guide groove extending parallel to the saw, an elongated work-holding member mounted in the guide groove and having a fixed jaw extending at right angles thereto and above the table, a gauge member adjustably slidably mounted on the fixed jaw and extending at an angle thereto, a movable clamping jaw member slidably mounted on the work-holding member and having a toothed portion, a frame extending over the movable clamping jaw member and having a guideway provided with angled portions, a toothed member engaging the toothed portion of the clamping jaw member and having angled portions which engage the angled portions of the frame, and a wedge member coacting with the inclined portions of the frame and the clamping jaw member for moving said clamping jaw member into clamping relation with the fixed jaw member.

18. In a device of the class described, a saw member, a table adjacent thereto having a guide groove, an elongated work-holding member movable in the guide groove and having a fixed jaw above the table, a gauge member adjustably slidably mounted on the fixed jaw and extending at an angle thereto, a movable clamping jaw member slidably mounted on the work-holding member and having a toothed portion, a frame extending over the movable clamping jaw member and having a guideway provided with angled portions, a toothed member engaging the toothed portion of the clamping jaw member and having angled portions which engage the angled portions of the frame, a wedge member coacting with the inclined portions of the frame and the clamping jaw member for moving said clamping jaw member into clamping relation with the fixed jaw member, a lever for moving the wedge member, and means for sustaining the lever.

19. In a device of the class described, a standard, a circular saw journaled thereon, a table adjustably mounted adjacent the saw and having a guide groove extending parallel to one side portion of the saw and a discharge portion extending at an angle, an elongated work-holding member extending into the guide groove and having a fixed jaw extending at right angles thereto and above the table and provided with a scale, a gauge member adjustably slidably mounted on the fixed jaw and extending at an angle thereto, a movable clamping jaw member slidably mounted on the work-holding member and having a toothed portion, a frame mounted on the work-holding member and extending over the toothed portion of the clamping jaw member and having a guideway provided with an angled portion, a toothed member engaging the toothed portion of the clamping jaw member and having an angled portion which engages the angled portion of the frame, a wedge member coacting with the inclined portions of the frame and the toothed member, and a lever for moving the wedge member.

20. In a device of the class described, a standard, a circular saw journaled thereon, a table adjustably mounted adjacent the saw and having a guide groove extending parallel to one side portion of the saw and a discharge portion extending at an angle, an elongated work-holding member extending into the guide groove and having a fixed jaw extending at right angles thereto and above the table and provided with a scale, a gauge member adjustably slidably mounted on the fixed jaw and extending at an angle thereto, a movable clamping jaw member slidably mounted on the work-holding member and having a toothed portion, a frame mounted on the work-holding member and extending over the toothed portion of the clamping jaw member and having a guideway provided with an angled portion, a toothed member engaging the toothed portion of the clamping jaw member and having an angled portion which engages the angled portion of the frame, a wedge member coacting with the inclined portions of the frame and the toothed member, a lever for moving the wedge member, means for sustaining the wedge in adjusted position, and a member for holding work at an angle with relation to the fixed jaw member and the gauge and coacting with the movable and the fixed clamping jaws.

21. In a device of the class described, a standard, a circular saw journaled thereon, a table adjustably mounted adjacent the saw and having a guide groove extending parallel to one side portion of the saw and a discharge portion extending at an angle, an elongated work-holding member extending into the guide groove and having a fixed jaw extending at right angles thereto and above the table and provided with a scale, a gauge member adjustably slidably mounted on the fixed jaw and extending at an angle thereto, a movable clamping jaw member slidably mounted on the work-holding member and having a toothed portion, a frame mounted on the work-holding member and extending over the toothed portion of the clamping jaw member and having a guideway provided with an angled portion, a toothed member engaging the toothed portion of the clamping jaw member and having an angled portion which engages the angled portion of the frame, a wedge member coacting with the inclined portions of the frame and the toothed member, a lever for moving the wedge member, a member for holding work at an angle with relation to the fixed jaw member and the gauge and coacting with the movable and the fixed clamping jaws, and another gauge member coacting with the member for holding work at an angle for gauging the work held thereby.

22. In a machine of the class described, a saw and means for clamping work in a position inclined to said saw for mitering said work and including a main body portion having an inclined edge, and a member pivotally connected to said body portion movable into a position to clamp the material to be mitered between said inclined edge and said pivotally mounted member.

23. In a machine of the class described, a saw and means for clamping work in a position inclined to said saw for mitering said work and including a main body portion having an inclined edge, and a member movably mounted on said body portion movable into a position to clamp the material to be mitered between said inclined edge and said movably mounted member.

24. In a machine of the class described, a saw and means for clamping work in a position inclined to said saw for mitering said work and including a main body portion having an inclined edge, a member movably mounted on said body portion movable into a position to clamp the material to be mitered between said inclined edge and said movably mounted member, and means for making a micrometer adjustment of the material to be mitered.

25. In a device of the class described, a saw and means for clamping work in a position inclined to said saw for mitering said work and including a main body portion, and a clamping arm pivotally connected thereto and movable into a position to clamp work between the body portion and pivotally mounted member.

26. In a machine of the class described, the combination of a work-supporting table, jaw members mounted thereon, a saw, mitering means associated therewith including a main body portion fixed with respect to one of said jaw members, and a movable member mounted on said main body portion for cooperating with said main body portion to secure work in a position to be mitered by said saw.

27. In a device of the class described, a circular saw member, a table adjacent thereto and having a guideway, a work-holding member movable in said guideway past the saw member, work clamping members carried by the work-holding member for holding work at different angles with relation to the holding member, and gauge members for positioning the work held by the clamping members.

28. In a device of the class described, a saw member having an adjustable cutter portion, a table adjacent thereto, a work holding member movable in a straight line parallel to one side portion of the saw and provided with a portion extending at right angles to its line of movement, a scaled work-cutting gauge carried by the right-angular portion of the holding member, and a scaled work-cutting gauge mounted on the table, said gauges being adjustable with relation to their indicating scales and the cutter portion to correct differences caused by adjusting the position of the cutter portion.

29. In a device of the class described, a saw member having an adjustable cutter portion, a guard covering the upper portion of said saw member, a table adjacent the saw member, a work-holding member movable in a straight line parallel to one side portion on the saw member, an adjustable gauge member carried by the work-holding member and having an indicating scale, and another adjustable gauge member mounted on the table and having an indicating scale, the line of cut of the cutter portion determining the zero position of the gauges and said gauges being adjustable to indicate said zero positions.

30. In a machine of the class described, a cutting member, a plurality of gauge members relatively adjustable with respect to each other to compensate for a movement of the cutting member and for determining a zero position.

31. In a machine of the class described, a table for supporting work, a cutting member operatively associated therewith, a gauge mounted upon said table and adapted to constitute an abutment for said work, means cooperating with said gauge for clamping work to be cut by said cutting member, said cutting member and said gauge being located on the same side of said work.

32. In a machine of the class described, a work support, cutting means operatively associated therewith, a gauge mounted upon said support, said gauge constituting an abutment for work to be cut, and clamping means cooperating with said gauge for holding said work, said gauge being located at the saw-approaching side of said work.

33. In a machine of the class described, a frame and a pair of slide members in said frame, one of which is movably mounted within the other, said slide members being movable in parallel directions, means for locking one of said slide members with respect to the other, said locking means including wedging means, and a spring-pressed plunger for yieldably retaining said wedging means.

34. In a machine of the class described, clamping means for retaining in position work to be treated, a circular saw, said clamping means including relatively movable slide members, each carrying a clamping jaw, one of said jaws including a gauge located on the side of the work adjacent to said saw, one of said slide members being movably mounted within the other to move in a direction parallel to the line of movement of said other side member.

35. In a saw trimmer, clamping means for retaining the work to be treated, said clamping means including relatively movable jaws, one of said jaws comprising an L-shaped member having elongated legs to span slug ribs to prevent fanning action of the slugs.

36. In a machine of the class described, a table for carrying work, a saw operatively associated therewith, trimming means operatively associated with said table, said saw being operative at the level at which said trimming means is inoperative, and means for adjusting said table vertically for controlling the operative relationships between said saw, said trimmer and said work.

37. In a device of the class described, a work supporting table, a saw member operatively associated therewith, a trimming member operatively associated with said table, one of said members being operative at a level at which the other is inoperative, and a lever operatively associated with said table, said lever in one position forming an abutment to hold said table at one level and in another position forming an abutment to hold said table at a different level whereby to control the operativeness of said saw means and said trimmer means.

38. In a device of the class described, the combination of a work supporting table, a saw operatively associated therewith, a mitering gauge carried by said table, clamping means carried by said table, said mitering means having a jaw for holding work in an angular position with relation to said saw, said clamping means being adapted to securely hold said mitering means and said jaw.

39. In a machine of the class described, a table for supporting work, a member slidably mounted thereon, and relatively movable clamping jaws carried by said slidably mounted member whereby material to be cut may be clamped in position.

40. In a machine of the class described, a table for supporting work, a member slidably mounted thereon, and relatively movable clamping jaws carried by said slidably mounted member whereby material to be cut may be clamped in position, one of said clamping jaws being movably mounted on said slidably mounted member.

41. In a machine of the class described, a table for supporting work, a gauge member on said table against which material to be cut is placed, and a clamping member cooperating with said gauge member for clamping the material in position, a portion of said clamping member being located under said gauge member.

42. In a machine of the class described, a table for supporting work, a slide movably mounted therein, a jaw fixed to said slide, and another jaw slidably mounted in said slide for cooperating to clamp in position material to be cut, a portion of one of said jaws passing under the other jaw.

43. In a machine of the class described, a table for supporting material to be cut, and means thereon for clamping material to be cut, said means including slide members, one of which is movably mounted within the other.

44. In a machine of the class described, a table for supporting material to be cut, and means thereon for clamping material to be cut, said means including slide members, one of which is movably mounted within the other, and means for locking one of said slide members with respect to the other.

45. In a machine of the class described, a table for supporting material to be cut, and means thereon for clamping material to be cut, said means including slide members, one of which is movably mounted within the other, means for locking one of said slide members with respect to the other, and means for releasably retaining said locking connection.

46. In a machine of the class described, a table for supporting material to be cut, and means thereon for clamping materials to be cut, said means including slide members one of which is movably mounted within the other, means for locking one of said slide members with respect to the other, and a spring-pressed plunger for yieldably retaining said sliding members in locking relation.

47. In a device of the class described, a table for supporting material to be cut, and clamping means thereon for retaining work to be treated, said clamping means including relatively movable slide members carrying clamping jaws, said slide members having interlocking portions, means for forcing said interlocking portions into operative association, and means for moving said interlocking portions out of operative association.

48. In a device of the class described, a table for supporting material to be cut, and clamping means thereon for retaining work to be treated, said clamping means including relatively movable slide members carrying clamping jaws, said slide members having interlocking portions, means for forcing said interlocking portions into operative association, means for moving said interlocking portions out of operative association, and means for retaining the interlocking portions in adjusted positions.

Signed at Pittsburgh, Pennsylvania, this 3rd day of January, 1921.

EDWARD CHESHIRE.